July 10, 1951    C. S. ASPENWALL    2,559,841
SUN VISOR FOR CABRIOLETS
Filed Dec. 9, 1947    2 Sheets-Sheet 1
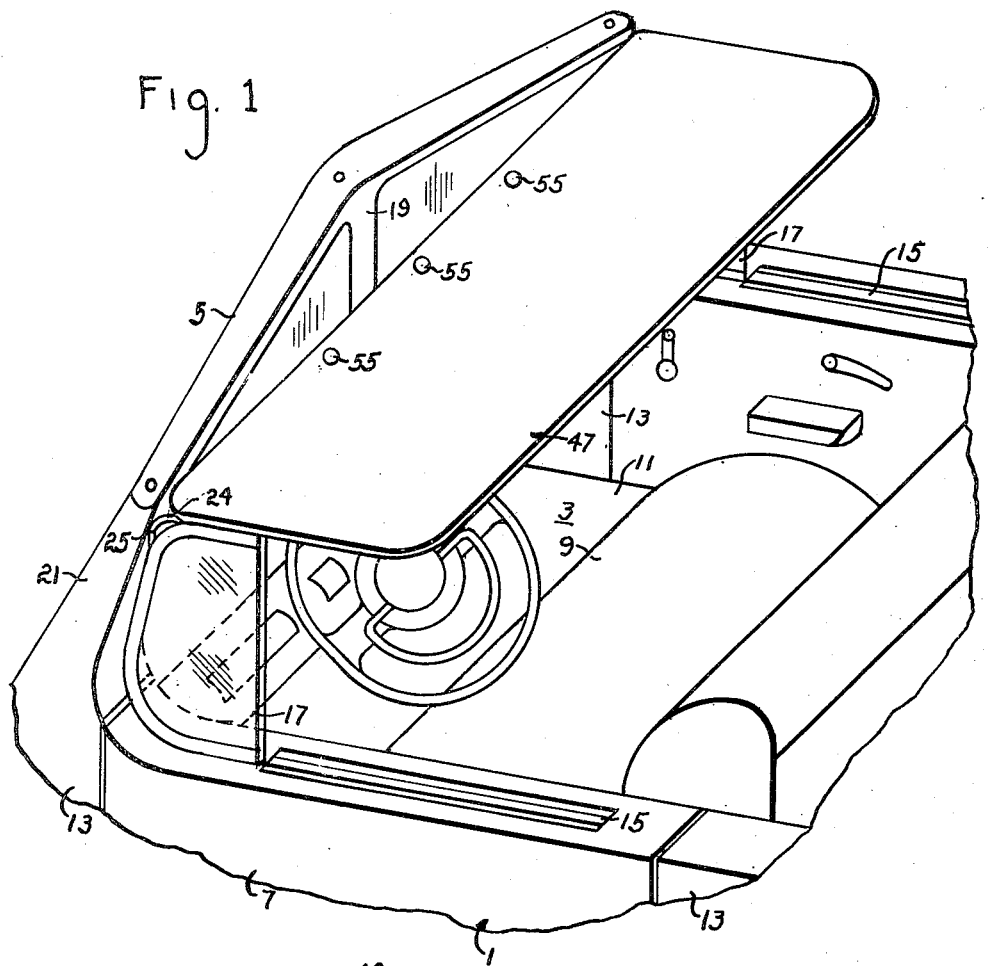
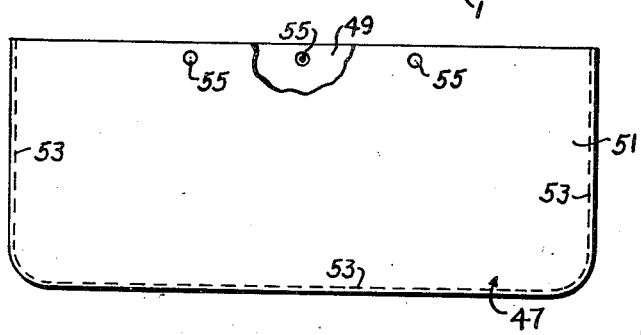
CARL S. ASPENWALL
INVENTOR.
BY Edmund W. E. Kamm
ATTORNEY July 10, 1951  C. S. ASPENWALL  2,559,841
SUN VISOR FOR CABRIOLETS
Filed Dec. 9, 1947  2 Sheets-Sheet 2

CARL S. ASPENWALL
*INVENTOR.*

BY Edmund W. E. Kamm
ATTORNEY

Patented July 10, 1951

2,559,841

UNITED STATES PATENT OFFICE 2,559,841

SUN VISOR FOR CABRIOLETS

Carl S. Aspenwall, Chicago, Ill., assignor to Eagle Industries, Inc., Chicago, Ill., a corporation of Illinois Application December 9, 1947, Serial No. 790,529

13 Claims. (Cl. 296—97)

This invention relates to a sun visor for a cabriolet or other open top automobiles, more specifically it relates to a sun visor which affords protection to the front seat occupants of the vehicle and which may be mounted and dismounted without mutilating any portion of the vehicle.

Heretofore much of the joy of motoring in an open top vehicle has been lost by insufficient protection of the occupants of the driver's seat from the sun's rays, particularly as the sun approaches its zenith. With this in mind I have invented the visor disclosed herein.

It is an object of this invention to provide a sun visor for open top automobiles.

It is another object of this invention to provide a sun visor for open top automobiles which may be mounted and dismounted without tools.

Another object of this invention is to provide a sun visor for open top automobiles which may be mounted and dismounted in a relatively short period of time.

A further object of this invention is to provide a sun visor for open top automobiles which may be mounted and dismounted without mutilating any portion of the automobile.

Yet another object of this invention is to provide a sun visor for open top automobiles which may be disassembled for storage in the luggage compartment when not in use.

It is still another object of this invention to provide a sun visor for open top automobiles which is light in weight.

A further object of this invention is to provide a sun visor for open top cars which will not interfere with the operation of the windows or the top.

It is yet another object of this invention to provide a visor for open top automobiles which will deflect down drafts over the windshield.

Still another object of the invention is to provide a visor which utilizes the two individual sun visors commonly provided on automobiles.

These and other objects will become apparent from a study of this specification and the drawings which are attached hereto and made a part hereof in which:

Figure 1 is an isometric view showing the driver's compartment with the sun visor in full assembled position.

Figure 4 is a detailed drawing of the visor cover.

Figure 2:
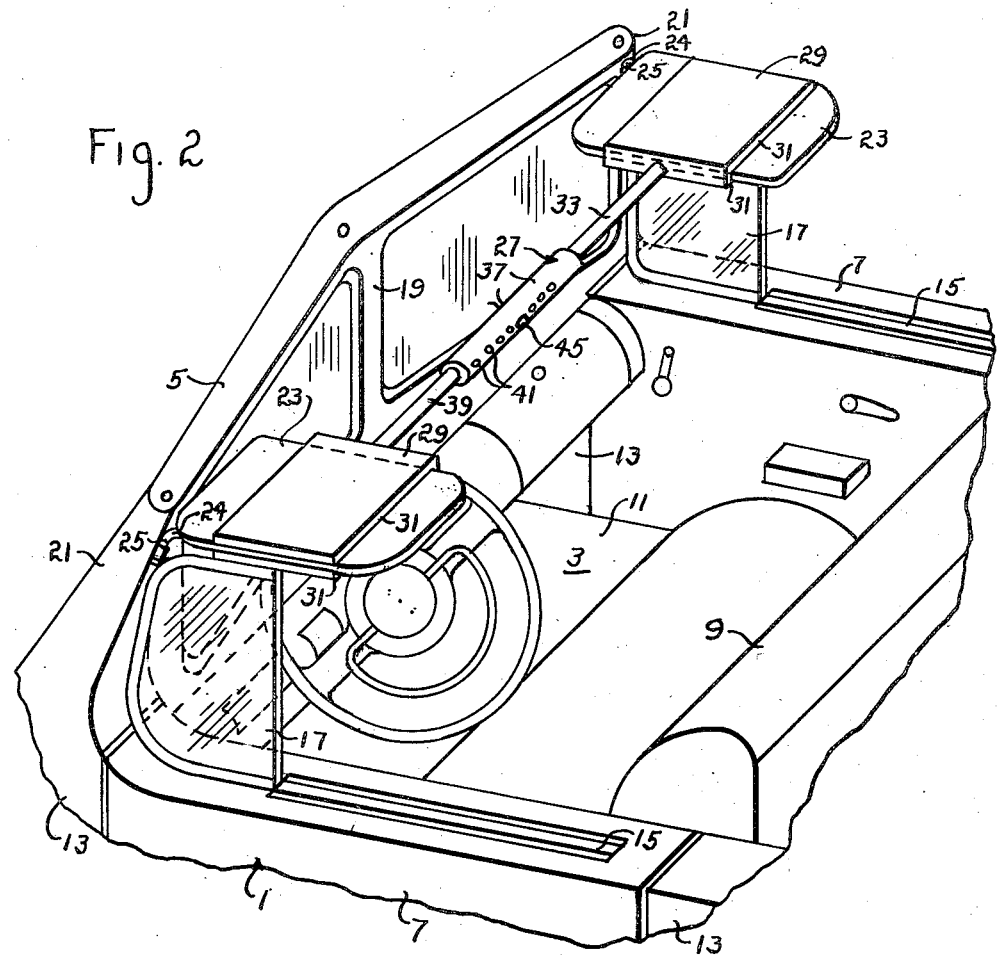
Figure 2 is a view similar to Figure 1 with the cover removed to show the supporting rod assembly mounted in position on the usual visors.
Figure 3:
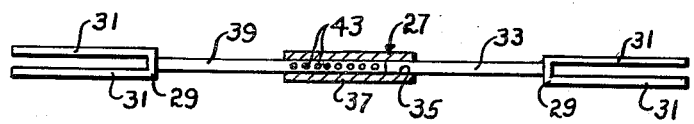
Figure 3 is a detailed drawing of the supporting rod assembly with the coupling broken away.

Referring to the drawings the numeral 1 is used to designate an open top automobile in general having a driver's compartment 3 formed by the windshield 5, the doors 7, the seat 9, the floor 11, and side panels 13. Windows 15 and draft regulating windows 17 are mounted on the doors and operate in the conventional manner. The windshield shown is of the split design having a center post 19 and two corner posts 21.

Visors 23, as shown in Figure 2, are usually standard equipment on automobiles of this type. Each comprises an L-shaped rod 24, which has one arm pivotally mounted, for rotation about a substantially vertical axis, in a bracket 25 fastened to a corner post 21 of the car. The visor 23 is mounted for pivoting about the axis of the horizontal arm and, if desired, sliding thereon.

In order to install my device, it is necessary to rotate the rods about the vertical axes until the horizontal arms extend parallel to each other and rearwardly after which the visors are swung to the horizontal position as shown in Figure 2. The supporting rod assembly can then be installed.

This supporting rod assembly 27 comprises two U-shaped yoke members 29, of light material such as thin wood, aluminum, etc., placed flatwise with the open side pointing outward and the legs engaging the sides of the visors 23. One of the members 29 has a brace rod 33 of wood or metal fixed to one member midway of the closed or inner side. The other end of this rod enters a hole 35 extending through the cylindrical coupling 37 and the two are fixed together to form a rigid unit. The other member 29 has a rod 39 fixed to it in a manner similar to the first subassembly and slidably enters the hole 35 at the end opposite the rod 33. The coupling 37 and the rod 39 are both formed with a series of transverse holes, 41 in the coupling and 43 in the rod which, when aligned, permit the insertion of a cotter pin 45 and provide for adjustment to accommodate varying distances between the visors 23 on different makes and models of automobiles.

The cover 47 for the visors 23 and the supporting rod assembly 27 is made of substantially rectangular bottom 49 and top pieces 51 of identically shaped cloth, leather, etc. which are placed one on top of the other so that the shapes conform and are sewed at the ends and at one side to form a pocket. The open side of the cover is preferably provided with snap fasteners 55 or other connecting means. One half of the snaps are fastened to the bottom 49 and the other half of the snaps are fastened to the top 51 in position to interengage.

Operation

To install the apparatus described above, it is necessary to turn the visors 23 to extend backward from the windshield parallel to each other and swivel them into horizontal co-planar positions and adjust them lengthwise on the rods if desired. The supporting rod assembly 27 is installed with the legs 31 of the U-shaped members straddling the visors 23. The length of the assembly is properly adjusted so that the visors are seated in the yoke and cannot pivot about the vertical axes toward each other and so that the cover, when it is applied, will be taut. The cotter pin 45 is inserted through any of the holes 41 and 43 of the coupling 37 and rod 39 which are in register so as to maintain the adjustment. The cover 47 is forced over the visors 23 and the supporting rod assembly 27 from the rear and the snaps 55 along the front or open end are joined to close the cover.

The visor will now appear as shown in Figure 1 and will remain in this position. The visor may be dismounted by reversing the steps outlined above and when disassembled its parts are small and compact so that they can be readily stored in the luggage compartment.

I prefer to space the centers of the holes in the coupling slightly more or less than the holes in rod 39 so that a finer adjustment of the distance between the outside edges of the visors can be made. This insures that the cover will fit tightly over the visors so that it will not be readily dislodged by the wind. Similarly, the closing of the front or open edge of the cover assists in keeping the wind out of the cover, thus reducing noises due to flapping and also assisting in maintaining the cover in place.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a visor for automobiles having spaced, windshield corner posts, the combination of brackets mounted on said posts, support means extending rearwardly from said brackets in substantially parallel relation, means detachably engaging said support means for holding said support means in spaced relation, said holding means being adjustable lengthwise to vary the spacing of the support means and a cover for enveloping said holding and support means, the tension of said cover being regulated by the length to which the holding means is adjusted.

2. In a visor for automobiles having spaced, windshield corner posts, the combination of brackets mounted on said posts, support means extending rearwardly from said brackets in substantially parallel relation, relatively telescoping means detachably engaging said support means for holding said support means in spaced relation, said holding means being adjustable to vary the spacing of the support means and a cover for said holding and support means, the tension of said cover being regulated by the length to which the holding means is adjusted.

3. In a visor for automobiles having spaced, windshield corner posts, the combination of brackets mounted on said posts, support means, one on each bracket, extending rearwardly from said brackets in substantially parallel relation, means detachably engaging said support means for holding said support means in spaced relation and a cover for said holding and support means, said cover being open on the forward end, and fastening means for closing the opening, the tension of said cover being regulated by the length to which the holding means is adjusted.

4. In a visor for automobiles having spaced, windshield corner posts, the combination of brackets mounted on said posts, support means mounted on said brackets for pivoting about the vertical axis and extending rearwardly from said brackets in substantially parallel relation, means for holding said support means in spaced relation and a cover for said holding and support means, said cover being in the form of a bag open on the forward edge, said cover and spaced reports being so related that the cover is held in stretched relation over said support.

5. In a visor for automobiles having spaced, windshield corner posts, the combination of brackets mounted on said posts, support means extending rearwardly from said brackets in substantially parallel relation, yoke means embracing and holding said support means in spaced relation and a cover for said holding and support means, said cover being constructed to hold said support means in said yokes.

6. In a visor for automobiles having spaced, windshield corner posts, the combination of brackets mounted on said posts, support means extending rearwardly from said brackets in substantially parallel relation, relatively telescoping means for holding said support means in spaced relation, said holding means being adjustable to vary the spacing of the support means, a cover for said holding and support means, said telescopic means having openings formed therein, and a pin entering said holes to hold said parts in adjusted relation.

7. In a visor for automobiles having spaced, windshield corner posts, the combination of brackets mounted on said posts, support means extending rearwardly from said brackets in substantially parallel relation, relatively telescoping means for holding said support means in spaced relation, said holding means being adjustable to vary the spacing of the support means, a cover for said holding and support means, said telescopic means having openings formed therein, and a pin entering said holes to hold said parts in adjusted relation, the holes in the telescoping means being spaced differently to provide a greater range of adjustment.

8. In a visor for automobiles having spaced, windshield corner posts, the combination of brackets mounted on said posts, support means extending rearwardly from said brackets in substantially parallel relation, visor blades pivoted on said supports, means for holding said blades in spaced relation and a cover for said holding and support means.

9. In a visor for automobiles having spaced, windshield corner posts, the combination of brackets mounted on said posts, support means extending rearwardly from said brackets in substantially parallel relation, visor blades pivoted and slidable on said supports, means for holding said blades in spaced relation and a cover for said holding and support means.

10. In a visor for automobiles having spaced, windshield corner posts, the combination of brackets mounted on said posts, support means extending rearwardly from said brackets in substantially parallel relation, visor blades pivoted on said supports, means, comprising flat yokes embracing the blades and a compression rod connecting said yokes, for holding said blades in spaced relation and a cover for said holding and support means.

11. In a visor for automobiles having spaced, windshield corner posts, the combination of brackets mounted on said posts, support means extending rearwardly from said brackets in substantially parallel relation, visor blades pivoted on said supports, means, comprising flat yokes embracing the blades and an extensible compression rod connecting said yokes, for holding said blades in spaced relation and a cover for said holding and support means.

12. In a visor for automobiles having spaced, windshield corner posts, the combination of brackets mounted on said posts, support means mounted on said brackets for pivoting about a vertical axis, a sun visor mounted on each support means for pivoting about a horizontal axis and extending rearwardly from said brackets in substantially parallel, coplanar relation with each other, means mounted on and extending between said support means for holding said visors in spaced, parallel relation and a cover for said holding means and visors, said cover being closed at the outer sides so as to envelop said visors and so as to be tensioned by said holding means.

13. In a visor for automobiles having spaced, windshield corner posts, the combination of brackets mounted on said posts, support means mounted on said brackets for pivoting about a vertical axis, a sun visor mounted on each support means for pivoting about a horizontal axis and extending rearwardly from said brackets in substantially parallel, coplanar relation with each other, means mounted on and extending between said support means for holding said visors in spaced, parallel relation and a cover for said holding means and visors, said cover being in the form of a bag open on the forward edge.

CARL S. ASPENWALL.

REFERENCES CITED

The following references are of record in the file of this patent:

UNITED STATES PATENTS

| Number | Name | Date |
|---|---|---|
| 1,368,986 | Sumner | Feb. 15, 1921 |
| 1,494,864 | Natman | May 20, 1924 |
| 1,732,447 | Crane | Oct. 22, 1929 |
| 2,238,981 | Newell | Apr. 22, 1941 |